Figure 2:
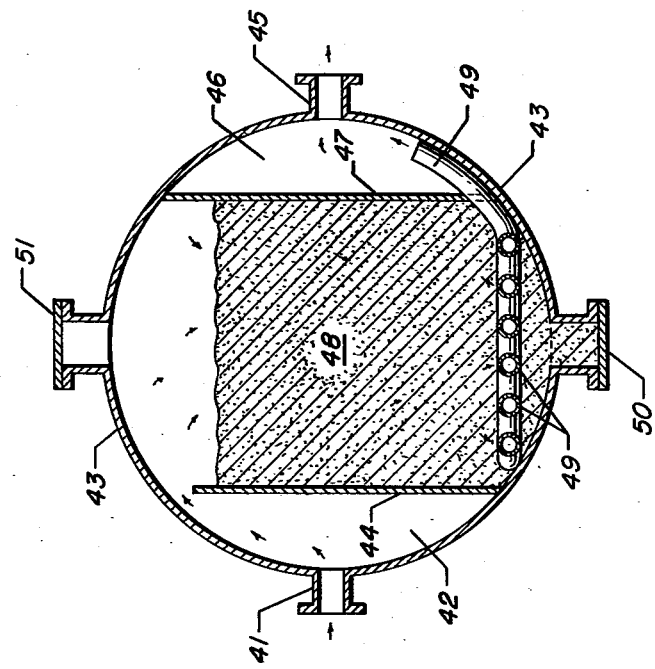

June 11, 1957  L. S. KASSEL  2,795,489
CONTACTOR
Filed July 19, 1955

INVENTOR:
Louis S. Kassel
By:
Chester J. Giuliani
ATTORNEY:
Glen R. Grunewald
AGENT:

2,795,489
Patented June 11, 1957

United States Patent Office

2,795,489

CONTACTOR

Louis S. Kassel, Oak Park, Ill., assignor to Universal Oil Products Company, Des Plaines, Ill., a corporation of Delaware Application July 19, 1955, Serial No. 522,950

1 Claim. (Cl. 23—288)

This invention relates to a fluid-solid contactor and in particular to an apparatus specially designed for the efficient contact of a fluid stream with a fixed bed of solid particles.

In many industrial applications it is desirable or necessary to contact a bed of solid particulate material with a fluid stream. Typical of these processes are such operations as leeching a soluble component from solid particles, removing impurities from a liquid by passing that liquid into contact with a bed of ion exchange material and effecting reactions within a fluid stream or between two components of a fluid stream by passing that stream over a bed of solid, particulate heterogeneous catalytic material. As an example of the latter process, straight run gasolines are improved by reforming them, which reforming is effected by passing vapor phase straight run gasoline mixed with hydrogen into contact with a reforming catalyst such as platinum impregnated pellets of alumina at high temperature and pressure.

Of the fixed bed operations that have been employed, at least 3 distinct classes can be identified. The regular fixed bed and the most commonly used comprises a vessel, usually cylindrical in shape, which has a screen member in the lower portion thereof upon which the solid particles of contact material are disposed. An inlet for the fluid in the upper portion of the vessel and an outlet for the fluid in the lower portion, below the screen, provide for the fluid to pass downwardly through the vessel, through the bed of particles and to discharge from the vessel free of particles. Although this method is quite efficient, it suffers from several drawbacks. When the fluid stream has solid particles entrained therein, such as flakes of iron oxide or sulfide from the vessels and conduits of the process or sand or dirt particles or the like, the upper portion of a fixed bed as above described will become clogged with these particles. This difficulty is not unusual in commercial processes which must use ordinary iron and steel equipment and handle large volumes of raw charge stock. The result of such clogging is that a continuously increasing pressure drop is required to pass the desired amount of fluid through the bed until ultimately the process must be shut down and the contact material replaced. This clogging effect also causes inefficient utilization of the contact material since the upper portion of the bed is covered with foreign particles which prevent contact and since the increased pressure drop across the upper portion of the bed results in increased velocity of the fluid in that portion of the bed with the resultant diminished residence time and incomplete utilization of the contact material. Another difficulty of the ordinary fixed bed is that in high pressure operations, when the diameter of the vessel must be maintained as small as possible in order to keep capital investment down, the depth to width ratio of an ordinary fixed bed usually is quite high therefore causing high pressure drops through the system with the resultant requirement of expensive compressing equipment. Another difficulty of the ordinary fixed bed is that it is difficult to effect the unloading of the bed since a lower retaining screen prevents merely opening the bottom of the vessel and allowing the particles to fall out.

Many of these difficulties may be avoided by employing what is known as a radial flow or annular bed. An annular bed is maintained in a vessel by placing in it concentric screens co-axial with the cylindrical vessel, one of large diameter and one of small diameter, and disposing the contact material between the two concentric screens. In an annular bed the fluid enters the top of the vessel, passes downwardly into the annular space between the vessel wall and the larger concentric screen, then flows horizontally and towards the center of the vessel through the annularly shaped bed of particles and ultimately through the smaller diameter concentric screen into the center pipe and out of the vessel through a lower outlet. The difficulty with an annular type bed is first, that the circular and concentric screens are difficult and expensive to make and equally difficult and expensive to properly install in a vessel. The screens are usually fragile in order to be readily fabricated and are subjected to crushing and distortion upon thermal expansion and contraction of the bed. A serious deficiency in an annular bed is that the cross section area of the bed parallel to the flow of fluid continuously decreases as the fluid flows through the bed. In other words, the cross section area of the bed at the periphery is substantially larger than the cross section area of the bed where it discharges into the center pipe. As a result of this continuous variation in cross section area the fluid passing through the bed must pass through at an increasing velocity. In order to have a reasonably low velocity at the center pipe, the material passing through the periphery of the bed passes through at an extremely slow rate and tends to "channel" or find low resistance paths through the bed through which most of the fluid passes thereby causing uneven distribution of contact of the fluid with the particles. This undesirable condition is magnified since the bulk of the catalyst is at the periphery of the bed. As in the regular or ordinary fixed bed, the annular bed is difficult to unload usually requiring either the removal of the center pipe or expensive and unwieldy offset opening in the bottom flange of the vessel.

Another type of fixed bed which has been used is the side-to-side bed wherein particles are maintained between two parallel vertical screens in a vertically mounted cylindrical vessel so that the fluid passes laterally through the vessel and through the bed of particles. A difficulty associated with this type of bed is that, in a cylindrical vessel the straight line path between the two screens is the path that the fluid preferentially follows. The areas that are not directly between the screens, that is, the areas formed by the chord of the intersection of the screens with the vessel constitute a relatively stagnant area where fluid flow is at below-average velocity. This area occupies a substantial percentage of the cross section area of the vessel and represents wasted space and wasted particles.

In both the annular flow bed and the side-to-side flow bed, vibrations and thermal expansions and contractions cause the catalyst bed to settle so that the bottom of the bed is packed denser than the top of the bed and so that the fines or small particles of catalyst accumulate at the bottom. As a result of this, after a short period of operation, there occurs a density gradient throughout the vertical bed so that the top part of the bed offers less resistance to flow than the bottom. Stated differently it requires a greater pressure drop for the same amount of fluid to flow through the bottom part of the bed than through the top. This results in a poor distribution of the flow with the greater quantity of fluid passing through the upper portion, where the least amount of catalyst is present, and a less amount of fluid passing through the bottom portion of the bed where a greater amount of catalyst is present. This condition has been at least partially remedied by causing the bulk of the pressure drop to be effected on the containing screens, however, pressure drop is an expensive item and the improved contact resulting from building greater pressure drop into a plant is a costly improvement.

It is an object of this invention to provide a specially designed apparatus which provides for a simple fixed bed of contact material of regular cross section area throughout the bed, free from clogging and with any desired values of depth and cross section, through which the fluid flows parallel to the particle density gradient and therefore is unaffected by it.

In one embodiment, this invention relates to a contacting apparatus comprising in combination a horizontal cylindrical shell closed at both ends, a vertical partition connected to said shell along the lower edge thereof and to the end closures along the vertical edges thereof which partition divides said shell into an inlet chamber and a contacting chamber, said chambers openly communicating over the top of said partition, an opening into said inlet chamber and fluid outlet means disposed in the lower portion of said contacting chamber.

In various specific embodiments of this invention the fluid outlet means employed in the lower portion of the contacting chamber may comprise variously a horizontal screen upon which the catalyst bed is disposed or a series of pipes attached to a header into which the fluid may flow.

In another embodiment, this invention comprises the use of two vertical partitions on opposite sides of the cylinder thereby forming either two inlet chambers or one inlet and one outlet chamber and also maintaining the bed of particles with straight, parallel sides so that the flow streams through the bed are straight and vertical.

In still another embodiment of this invention, at least one catalyst inlet is maintained in the top of the cylindrical shell and at least one catalyst outlet is maintained in the bottom of the vertical shell or in the lower portion of its end closures to provide for particle withdrawal.

From the foregoing description and from the following specific descriptions it may be seen that the present invention provides a fluid-solid contactor which provides a contacting process with all of the following attributes. The bed of contact material has a uniform cross section perpendicular to the direction of flow so that all portions of the bed receive equal treatment from the fluid. The contactor of this invention provides for a simple inexpensive downflow contact which preserves the particles physically and requires a minimum of pressure drop and permits a maximum range of operating conditions to the process in that there are no limitations on flow rates, etc. The apparatus of this invention provides for a bed depth which is independent of the size so that a rigid restriction on the depth to width ratio of the bed need not be imposed. This is particularly valuable in high pressure operations wherein each increment of increased diameter of a pressure vessel adds a much greater increment to the required wall thickness and hence the ultimate cost of the vessel. The process of this invention may employ small diameter vessels of greater length in order to maintain the same amount of particles in contact with the fluid thereby greatly diminishing the ultimate expense of the plant and increasing its safety. The apparatus of this invention provides for a trash collection zone ahead of the catalyst bed. The inlet chambers formed by the hereinbefore described partitions introduce into the flow stream a low velocity settling zone in which the fluid stream abruptly changes direction so that most of the entrained solid particles in the stream will settle in the inlet chamber and not be carried over to clog the catalyst bed. The apparatus of this invention provides for a simple and sturdy internal structure which is readily installed and maintained. The flat baffles which need withstand no pressure except to contain the particle bed may be made of readily available metal plate and require no perforations or other treatment. At least in several of the embodiments of this invention the contact material may be added to and removed from the contact chamber without disassembling the chamber from the fluid stream and without disturbing the internal constructtion of the chamber. These desirable charactteristics and others are all provided in the apparatus of this invention.

The apparatus of this invention can best be explained with reference to the accompanying drawings which show in Figures 1 and 2 respectively variations and modifications of this invention. It is intended that the drawings and the following description are illustrative of the broad scope of this invetnion and not limiting upon it to the specific embodiments herein shown and described.

Figure 1:
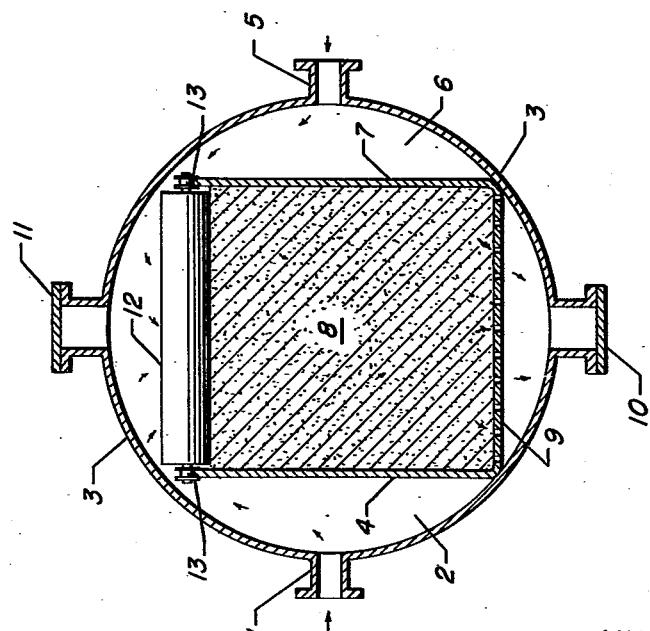

Referring to Figure 1, there is shown a sectional elevational view of one embodiment of this invention. The invention will be described with reference to a reforming process in which a combined vapor stream of straight run gasoline vapors and hydrogen-containing gas is contacted with a bed of platinum-containing alumina pellets at a temperature of from about 700° F. to about 1000° F. and a pressure of from about 200 p. s. i. to about 1000 p. s. i. The combined vapor stream of hydrogen and hydrocarbon enters inlet 1 into inlet chamber 2 formed by the cylindrical shell 3 of the reaction zone and internal partition 4 connected to the lower portion of the cylindrical shell and to both of its end closures but not to the top. The hydrocarbon and hydrogen stream experiences a velocity reduction within chamber 2 and impinges upon partition 4 so that any solid particles such as iron oxide or iron sulfide flakes resulting from the corrosion of conduits, tanks or vessels fall to the bottom of inlet chamber 2 and collect there. The stream of vapors passes substantially free of particles over the top of partition 4 and there changes direction and passes downwardly through the bed of catalytic material 8. Although not required, to keep the bed of equal cross section partition 7 may be disposed opposite partition 4 and when so disposed will form chamber 6. In this particular embodiment, it is desirable to place inlet 5 in the side of shell 3 so that the vaporous charge may be fed both into chamber 2 and chamber 6 simultaneously after which it combines above bed 8 and passes therethrough. The advantage to two inlets is that the velocity in the inlet chambers is even lower which is more conducive to particle settling.

The fluid withdrawal means of this particular embodiment consists of screen 9 disposed in the lower portion of shell 3 and attached to the shell and to vertical partitions 4 and 7. Screen 9 has openings which permit the fluid reaction products to pass therethrough but not the catalyst particles thereby effecting a separation of the heterogeneous mixture. Fluid outlet 10 is disposed in the lower portion of cylindrical shell 3 for the obvious purpose of discharging the reaction product from the reaction zone and passing it to whatever separation and finishing procedures may be effected on it. Opening 11 into cylindrical shell 3 is pictured here with a blank flange and that is the way this opening is maintained during operation, however, the opening is desirable to provide for readily filling the reaction chamber with catalytic material. Although not shown, the end closure of vessel 3 may be provided with an access opening in the lower portion thereof, approximately at a height slightly above screen 9 for use in discharging spent catalyst from the reaction zone when it is necessary. It may be desirable to have a series of openings 11 when the reaction vessel has a long horizontal dimension and it may similarly be desirable to have catalyst discharge ports at both end closures or intermediate points along the side of the vessel wall.

The apparatus of this invention is preferably adapted with scraper 12 for evenly distributing the particles over the length of the vessel and forming a smooth surface of particles. This bed leveling means may be mounted on a rail or rod and may be driven by hand from a port, in an end closure or by other suitable means. In this embodiment a particularly convenient means is employed. Scraper 12 in this embodiment is mounted between wheels 13 which ride on the top of partitions 4 and 7 so that these partitions act as rails both for guiding the direction of movement of scraper 12 and for regulating the depth of bed 8.

Figure 2 illustrates a sectional elevational view of another embodiment of this invention. In Figure 2, the hydrogen and hydrocarbon charge pass through inlet 41 into inlet chamber 42 wherein the usual separation of solid particles is effected and the vapor stream passes over partition 44 above catalyst bed 48. Partition 47 opposite partition 44 is connected to the top of shell 43 so that chamber 46 formed between partition 47 and shell 43 is not in direct open communication with the upper portion of bed 48. The hydrogen and hydrocarbon charge therefore pass downwardly through bed 48 and discharge from the lower portion of bed 48 through perforations maintained in a maze of pipes connected to a common header 49 in the lower portion of the reaction zone. This header discharges into collection chamber 46 and ultimately from the vessel through outlet 45 in the side thereof. Inlet 51 and outlet 50 are maintained for the addition and withdrawal respectively of catalyst when such is required. In this embodiment, again it is not required to disturb the internal construction or the external connections of the reaction vessel in order to change catalyst when the catalyst becomes spent. It is, of course, obvious again in this embodiment that multiple inlet and outlets may be employed and multiple headers with their attached pipe mazes may be employed depending upon the capacity of the headers, the length of the vessel and other considerations. In this embodiment, it may also be desirable to eliminate collection chamber 46 and discharge header 49 directly, for example, through the end closure of shell 43, however, the method employed will depend upon the particular problems of the specific process. The apparatus of this embodiment may, as in the previous embodiment, have a suitably mounted bed leveling or scraping means.

The various conduits, fittings, pumps, compressors, gauges, instruments, etc. which are normally employed in such a process form no part of this invention and will not be discussed in detail except to state that it is intended that they will be used to perform their usual function in the conventional manner when required.

I claim as my invention:

A contacting apparatus comprising a horizontal cylindrical shell, a pair of horizontally spaced, vertical imperforate partitions connected to the shell along the lower inner wall of the shell and terminating short of the upper inner wall of the shell, said partitions extending lengthwise of said shell and dividing the shell into a central contacting chamber and segmental inlet chambers on opposite sides of the central chamber, the inlet chambers being provided with fluid inlet means on opposite sides of the shell and communicating with the contacting chamber over the tops of said partitions, a horizontal perforated partition connecting the lower edges of said vertical partitions along the lower portion of the shell for retaining solid contact material within said central chamber, and a fluid outlet in the bottom of the shell below said horizontal partition.

References Cited in the file of this patent
UNITED STATES PATENTS

| | | |
|---|---|---|
| 2,222,884 | Stowe | Nov. 26, 1940 |
| 2,330,068 | Marancik et al. | Sept. 21, 1943 |
| 2,657,121 | Rollins | Oct. 27, 1953 |